United States Patent [19]

Kishi

[11] 4,122,231

[45] Oct. 24, 1978

[54] NONCOMBUSTIBLE, SMOKELESS BUILDING COMPOSITE MATERIAL AND ITS METHOD OF MANUFACTURE

[75] Inventor: Ken Kishi, Tokyo, Japan

[73] Assignee: Showa Vermiculite Kabushiki Kaisha, Japan

[21] Appl. No.: 809,720

[22] Filed: Jun. 24, 1977

Related U.S. Application Data

[62] Division of Ser. No. 719,502, Sep. 1, 1976.

[51] Int. Cl.² .................................................. B32B 3/26
[52] U.S. Cl. ........................................ 428/310; 106/84; 428/323; 428/403
[58] Field of Search ................... 106/84; 428/310, 325, 428/324, 331, 323, 403, 406

[56] References Cited

U.S. PATENT DOCUMENTS

| 3,184,371 | 5/1965 | Seidl | 428/313 |
|---|---|---|---|
| 3,466,222 | 9/1969 | Curtis | 428/313 |
| 3,515,624 | 6/1970 | Garnero | 428/310 |
| 3,728,209 | 4/1973 | Sugaike et al. | 428/310 |
| 3,933,514 | 1/1976 | Banks et al. | 106/84 |

*Primary Examiner*—William J. Van Balen
*Attorney, Agent, or Firm*—Wenderoth, Lind & Ponack

[57] ABSTRACT

A novel building composite material and its manufacturing method wherein the material has water-insoluble and moisture-absorbing properties, is noncombustible and smokeless, and comprises a pattern-surfaced base material, composed of a mixture of foamed inorganic substances and inorganic adhesive which renders the inorganic substances water-insoluble, shaped by molding the mixture under heating and pressure, and a coating of glaze material applied to the base material and having a multitude of micropores formed thereon. The method consists of mixing foamed inorganic substances with inorganic adhesive of a character which renders the inorganic substances water-insoluble, molding the mixture under heating and pressure to a pattern-surfaced base material, applying a coating of engobe material to the surface of the base material and then a coating of glaze material, and obtaining a product having a multitude of micropores formed thereon through a baking process.

12 Claims, 1 Drawing Figure

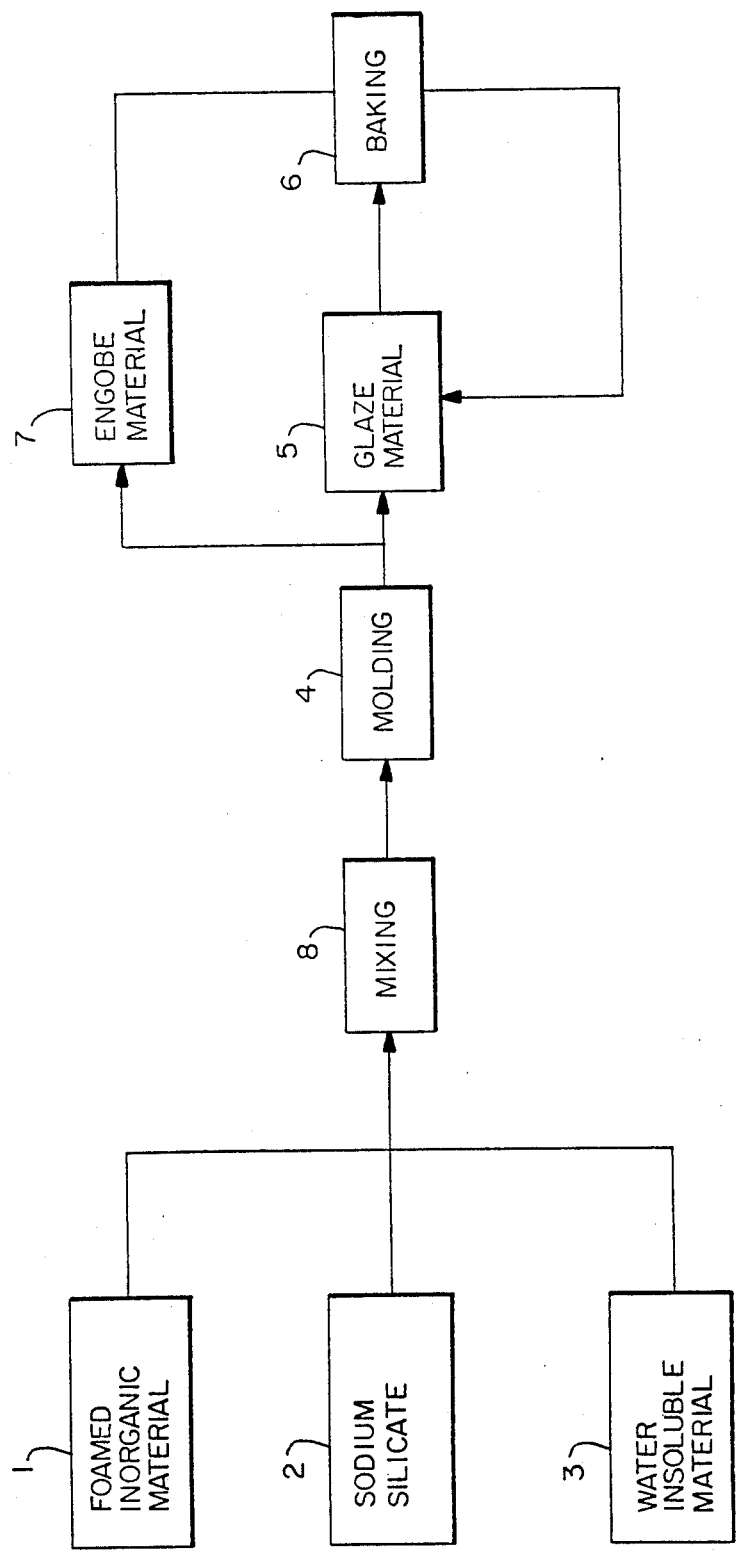

NONCOMBUSTIBLE, SMOKELESS BUILDING COMPOSITE MATERIAL AND ITS METHOD OF MANUFACTURE

This is a division of application Ser. No. 719,502, filed Sept. 1, 1976.

BACKGROUND OF THE INVENTION

The present invention relates to a noncombustible and smokeless building material, more particularly to a building composite material which has water-insoluble and moisture-absorbing properties, and to a method of manufacturing the same.

In recent years, noncombustible building materials composed mainly of inorganic substances have been developed rapidly so as to meet fire protection needs, and a great number of proposals therefor have been made, most of which suggest methods of combining inorganic substances, in fiber or granular forms, by means of inorganic adhesive material. Particularly, a considerable quantity of sodium silicate has been used as an inorganic adhesive because of its relatively low cost. However, the use of sodium silicate presents disadvantages in the fact that it has a high degree of alkaline concentration in an effluent water solution, and also its strength gradually decreases because of its water-soluble character. In order to eliminate these disadvantages, other improved methods have been proposed, one of which consists of adding a hardening agent or hardener to sodium silicate, and another of which involves a long-time curing process at temperatures of 100° to 200° C. A further method has also been suggested in which such additives as lithium silicate, amine silicate and denatured colloid silica are used. However, all of these conventional methods retain the outstanding problem of water-solubility.

In the light of the above disadvantages and problems, the present invention provides a noncombustible and smokeless building composite material which has both water-insoluble and moisture-absorbing properties, and a method for the manufacture thereof.

SUMMARY OF INVENTION

It is therefore one object of the present invention to provide a noncombustible and smokeless building composite material which has water-insoluble and moisture-absorbing properties.

It is another object of the present invention to provide a light-weight material which has low heat-conductivity and sound-insulation properties.

It is still another object of the present invention to provide a method of manufacturing a noncombustible and smokeless building composite material, whereby various materials of different colors, patterns, sizes and thicknesses can be obtained.

A further object is to provide a method of manufacturing a building material, whereby mass-production can be achieved under controlled manufacturing conditions.

Other objects and advantages of the invention will become apparent from the detailed description which follows.

DESCRIPTION OF DRAWING

The single FIGURE is a block diagram showing the process of manufacturing a noncombustible and smokeless composite material according to the present invention.

DESCRIPTION OF THE PREFERRED EMBODIMENTS

In accordance with the present invention, the adhesive material used is obtained by mixing sodium silicate with a mixture of 1.6 parts of condensed aluminum phosphate, 104 parts of non-colloidal silica, 4 parts of titanium dioxide, 100 parts of colloidal silica, 0.4 part of gel-forming agent extracted from bentonite and 5 parts of acrylic acid ester, all parts being by weight (this mixture is hereinafter called "ASC-3", commercially known as such and manufactured by Seto Ceramics Raw Material Co., Ltd., Japan). The sodium silicate and ASC-3 are mixed at a weight ratio of from 6:1 to 2:1, the preferable ratio being 4:1.

The adhesive material thus obtained is then mixed with foamed inorganic material while being stirred, and the resulting mixture is next poured into a metal mold so that it can be formed into a base material by the application of heat and pressure. Then a coating of glaze material is applied to the surface of the base material to impart a glossy surface thereto, and the thus coated base material is subjected to a baking process in a baking furnace at a temperature of at least 700° C. It should be noted that the product obtained after the baking process is perfectly insoluble in water, and its strength is about 20 to 40% greater than that before the baking process.

In the case described above, the adhesive material is made by adding ASC-3 to sodium silicate. In another case, lithium silicate (for example that commercially known as "lithium silicate 35" manufactured by Nissan Chemical Co., Ltd., Japan) or denatured silica sol (for example that commercially known as "B-106" manufactured by Nissan Chemical Co., Ltd., Japan) is used as a substitute for the ASC-3, and is mixed with sodium silicate. The weight ratio between the sodium silicate and the lithium silicate or denatured silica sol is from 6:1 to 2:1, the preferable ratio being 4:1. The mixture thus obtained is mixed with foamed inorganic material while being stirred, and the resulting mixture is formed into a base material, and then coated and baked as described above in connection with the use of ASC-3. After the baking process, the product obtained is insoluble in water.

In a further case, aluminium phosphate or a substance composed of a combination of aluminium and phosphoric acids (commercially known as "Winnofos" developed by Mond Division, ICI, U.S.A.) is used instead of the ASC-3, and is mixed with sodium silicate to form an adhesive material. The weight ratio between the sodium silicate and the aluminium phosphate or Winnofos is from 6:1 to 2:1, the preferable ratio being 5:1. The use of Winnofos shows the same good results as the use of ASC-3.

Among the three cases described above, the ASC-3 and Winnofos have proved the most satisfactory.

As shown in the FIGURE, in accordance with the present invention, foamed inorganic material 1 is first obtained by foaming an amount of inorganic material either by fusing volatile substances structurally contained therein during a short-time baking process or by incorporating air bubbles in the inorganic material by means of introducing jets of air therein. In the latter case, air bubbles are formed by making use of the viscosity and surface-tension properties of the inorganic material. The inorganic material 1 thus foamed is then mixed with inorganic adhesive material, shown at 8, which is composed mainly of sodium silicate 2 mixed with water-insoluble material 3. The mixture of 1, 2 and 3 is next poured into a metal mold, for example, in which it is formed into a base material of any desired shape by the application of heat and pressure, as shown at 4, said metal mold having a pattern board placed at the bottom thereof which provides the base material with an embossed, i.e., patterned, surface. The temperature and pressure employed during molding of the base material range from 105° to 145° C and from 3.5 to 22 kg/cm$^2$, and are applied for about 10–25 minutes.

Next, the base material has a coating of glaze material applied to the surface thereof, as shown at 5, and is further subjected to a baking process in a baking furnace or oven at a temperature of from about 670° to about 825° C, generally for about 2-3 minutes, as shown at 6. Alternatively, the molded base material first has a coating of engobe material applied to the surface thereof, as shown at 7, is next baked at a temperature of from about 630° to 770° C for 2-3 minutes, and then has a coating of glaze material applied thereto to form a glaze-coated surface thereon, as shown at 5, and is again baked in the furnace under the temperature and time conditions noted above when the engobe material is not utilized.

The base material manufactured through the procedures described above possesses both noncombustible and smokeless properties, and has a multitude of micropores formed on the surface thereof through oxidizing and reducing effects of the coated glaze material, as well as a layer of silicate mixture deposited on the surface. The number of micropores per unit surface area ranges from about 600 to about 675/cm$^2$, generally about 640/cm$^2$, and the average diameter of the micropores is from about 15 to about 25 microns, generally about 20 microns, depending on the thickness of the glaze coating, i.e., the diameter of the micropores decreases as the thickness of the glaze coating increases. The average distance between adjacent micropores is from about 35 to about 45 microns, generally about 40 microns.

The base material, following the molding step, can have a thickness of up to 100 mm. Generally its thickness ranges from about 6 to about 10 mm. The thickness of the coating of the glaze material is generally from about 0.005 to about 1 mm and that of the engobe material, when used, is generally from about 0.005 to about 0.5 mm. Usually, as the specific gravity of the base material is decreased the thickness of the glaze and/or engobe material coatings should be increased.

It should also be noted that, through the heating or baking process in the baking furnace, the inorganic adhesive substances contained in the base material serve to strengthen and bond the different materials therein as it is formed into a water-insoluble matrix structure. In this case, the base material develops increased mechanical strength by adding inorganic fibers, carbon fibers or metal fibers thereto prior to molding, generally in an amount of up to 3% by weight based on the weight of the foamed inorganic material. Thus, the final product provides a number of advantages which include a light weight (specific gravity of less than 1.0), a better moisture-absorbing characteristic, mechanical and chemical properties which deteriorate only a few percent due to water absorption, and an almost neutral effluent water. It also provides a beautiful look or appearance, and its colors or patterns can be varied depending on the choice of different pattern boards. As noted, its most significant feature is its noncombustible and smokeless characteristics.

The noncombustible and smokeless composite material according to the invention offers a variety of uses or applications which include structural interior facing materials, partitioning materials in ship or boat building, interior facing materials in automotive vehicles, wall facing materials in fireproofing or fire protecting areas, inner wall materials in chimneys, light-weight fire brick materials, and other interior facing materials.

The foamed inorganic materials used in accordance with this invention include those commercially known as vermiculite, perlite, silas balloon, alumina pulp, carnamite, amosphur, silica balloon, dia balloon, micro balloon and glass micro balloon.

Sodium silicates used in this invention include sodium silicates No. 1 to No. 4, as specified in JIS-K-1408, as described in the following table:

| Class | No. 1 | No. 2 | No. 3 | No. 4 |
|---|---|---|---|---|
| Specific Gravity (Be) | 759 | 754 | 740 | 730 |
| SiO$_2$(%) | 36 to 38 | 34 to 36 | 28 to 30 | 23 to 25 |
| Na$_2$O(%) | 17 to 18 | 14 to 15 | 9 to 11 | 6 to 7 |

In embodying the present invention, however, sodium silicate No. 3 proves most suitable because of its high viscosity.

As described earlier, ASC-3, aluminum phosphate, Winnofos, lithium silicate or denatured silica sol is added to sodium silicate so that the former render the sodium silicate insoluble in water. Experimental results show that the ASC-3 or Winnofos is the most satisfactory for this purpose, and that when the ratio of sodium silicate to the additives is 4 to 1 (using ASC-3, lithium silicate or denatured silica sol) or 5 to 1 (using aluminum phosphate or Winnofos), it provides the best results. When the ratio of foamed inorganic material to inorganic adhesive material is from 1:1 to 1:0.5, preferably 1:0.5, or more preferably 55 to 45, by weight, the best results are obtained.

The present invention will now be further described by way of several preferred examples thereof.

EXAMPLE I

Approximately 50 g. of ASC-3 is added to approximately 190 g. of sodium silicate No. 3, gradually during a period of about one minute while being stirred, to form an adhesive mixture in a liquid state. The adhesive mixture is then gradually added to approximately 240 g. of foamed vermiculite in a wholly dried state so that a sticky mixture can be formed. The mixture thus obtained is next poured into a 28 × 28cm metal mold with an aluminum-made embossed pattern board placed at the bottom thereof so that it can be formed into a shaped base material. In more detail, the mold having the mixture therein is placed in a hot press at about 125° C, and is compressed under an initial pressure of approximately 17 kg/cm$^2$ so that it can be formed by means of a 6 mm bar to a shape of desired thickness. Immediately after the compression process, the initial pressure is reduced to about 4 kg/cm$^2$, allowing it to cool during a period of about 15 minutes. During this period of 15 minutes, the pressures are reduced several times so that air can be vented or removed from inside the base material. In a predetermined period of time, the base material is then removed from the hot press, and is formed to a pattern-surfaced base material of 6 mm thickness and specific gravity of 0.75.

In the meantime, approximately 25 g. of sodium silicate and approximately 25 g. of ASC-3 are mixed together to form a mixture in a liquid state, and the mixture is further mixed with another 100 g. of water while being stirred, resulting in a mixture in a liquid state. The mixture is then uniformly applied to the whole surface of the base material. The amount of the mixture applied is preferably 0.006 g/cm$^2$ of the whole surface of the base material. It should be noted that the base material contains, by weight, 80 parts (actually 28 g.) of sodium silicate and 20 parts of ASC-3 with respect to 100 parts of vermiculite.

After the base material has been processed in the above manner, it is then coated with engobe material, in an amount of approximately 0.005 to 0.006 g/cm$^2$, on the entire surface thereof, and is subjected to drying at a temperature of 120° C during a period of about 15 minutes. It is further placed in a baking furnace or oven at a temperature of approximately 700° C and baked during a period of about 2.5 minutes. At the end of this time, it is removed from the baking furnace, and is then cooled rapidly back to room temperature. During cooling it is coated by applying a glaze material to the surface thereof. [Note that the method according to the invention is classed as E method and G method, the E method consisting of making the embossed-pattern surface of the base material a dull or matted surface, and the G method consisting of making a glossy surface of the base material.] The amount of glaze material to be applied is preferably 0.02 to 0.05 g/cm$^2$ for the E method, preferably 0.02 to 0.05 g/cm$^2$ for the G method, and about 0.02 g/cm$^2$ for yellow-brown color patterns.

After the application of glaze material as specified above, the base material is further placed in an electric range or oven in which it is subjected to drying during a period of about 1.5 minutes. It is then placed in a baking furnace at 700° ± 30° C where it is baked during a period of about 2.5 minutes. At the end of this period, it is again removed from the furnace, and is allowed to cool back to room temperature so that it has a layer or film of silicate mixture uniformly formed on the surface thereof, said layer or film having a multitude of micropores thereon, the average diameter of which is about 20 microns.

Thus, a final product is obtained, providing both noncombustible and smokeless characteristics. It should be noted that the final product has about the same thickness and specific gravity as the earlier-mentioned base material, i.e., 6 mm thick and specific gravity of 0.75. The final product may be used with other commercial plywood or laminated board, fiber board, asbestos board or plaster board to which it is attached by means of commercial adhesive materials. As noted from the above description, the product according to the invention can be used as building materials, such as wall, floor and other interior materials, for example.

The engobe material mentioned earlier comprises a mixture of 100 parts of kaolin, 50 parts of frit, 0.75 part of cobalt oxide (this serves to make the mixture green or a similar color) and 300 parts of water, all parts being by weight, said mixture being obtained by thoroughly milling these substances to fine particles. The glaze material comprises a well-milled mixture of 100 parts of white lead, 50 parts of frit, one part of carboxymethyl cellulose (thereinafter referred to as "CMC") and 1-15 parts of metal oxides, all parts being by weight. The amount of metal oxide used depends on the colors desired as far as the G method is concerned, such as 5 to 15 parts of iron oxides and 1 to 1.5 parts of cobalt for the green colors, and 8 to 9 parts of iron oxides for the yellow and brown colors; in the E method, 6 parts of iron oxides for the green colors and 9 parts of iron oxides for the brown colors.

EXAMPLE II

Wastes which are obtained by cutting the product or base material obtained in Example I, so that it can be shaped to the desired dimensions, or wastes of broken products, are used as raw materials. Those wastes are first milled to fine particles or grains, and are then sifted through Tyler-Standard screen scale 32-mesh screen. The screened particles are subjected to the drying process until well dried. Approximately 240 g. of sodium silicate No. 3 and approximately 60 g. of ASC-3 are thoroughly mixed to form a mixture in a liquid state, and the mixture is gradually added to about 600 g. of the dried particles, resulting in a uniform mass or mixture. The other subsequent procedures are followed in the same manner as in Example I. The final product thus obtained provides a beautiful appearance having a distribution of tile-like substances in fine powder forms. It has an apparent specific gravity of 0.96.

EXAMPLE III

About 20 g. of ASC-3 is gradually added to about 100 g. of sodium silicate No. 3 while being stirred. After completion of the stirring and mixing process for about 1.5 minutes, during which a liquid mixture is formed, the mixture is gradually added to about 120 g. of vermiculite so that the latter can be attached to the former. Then, a mixture composed of about 60 g. of white lead, about 30 g. of frit and about 9 g. of iron oxide, which is obtained by thoroughly milling these substances to fine grains, is added to the vermiculite-containing mixture, and is thoroughly mixed therewith by stirring the two mixtures in a blending manner. The mixture thus obtained is poured into a 15 × 15cm metal mold in which it is formed to a desired shape, and the mold is set in a hot press. The hot press provides temperatures of approximately 120° to 130° C, and pressures of approximately 20 kg/cm$^2$ during a period of 1 minute. After lapse of this period, the pressure is released from the hot press, and is again applied. The applied compression pressures are equal to approximately 10 kg/cm$^2$ under which the thickness of the material is adjusted by means of a bar or like until the product has a thickness of approximately 10 mm. After the material is placed under the pressure of approximately 10 kg/cm$^2$, air is vented from inside the material several times, and then the material is allowed to cool back to room temperature during a period of about 20 minutes. After this period, the product is removed from the hot press, and a base material is thus obtained. The base material provides a specific gravity of approximately 0.77. It may be used as a final product, but may also be subjected to the further processes as described in the Example I, in which the additional glaze coating and baking processes follow. After the additional process, the product has about the same specific gravity as the base material, which is equal to 0.77.

EXAMPLE IV

A mixture is prepared by gradually adding about 70 g. of ASC-3 to about 280 g. of sodium silicate while being stirred, and is then added to about 350 g. of silas balloon. The resultant mixture is poured into a 28 × 28cm metal mold having an aluminium-made pattern board at the bottom thereof, so that it can be formed into the desired shape. The mold is set in a hot press. The hot press provides a temperature of approximately 120° C, and an initial pressure of approximately 20 kg/cm$^2$ during a period of about one minute. After this period, during which the mixture is compressed under the indicated initial pressure, the pressure is released so that air can be vented from inside the molded material. Then, it is heat-pressed under a pressure of about 6 kg/cm$^2$ during a period of about 13 minutes. It is also desirable that the pressure is released every 3 minutes during this period so that air can be vented. After the hot-pressing process, the mold is then removed from the hot press, and is allowed to cool to room temperature. The surface of the thus obtained base material is coated with a mixture which is obtained by mixing about 25 g. of sodium silicate with a mixture of about 25 g. of ASC-3 and about 100 g. of water. The three-component mixture is applied uniformly over the surface of the base material at the rate of about 0.006 g/cm$^2$. Then, the base material is placed in a drier at a temperature of approximately 120° C, in which it is subjected to drying during a period of about 5 minutes. After the drying process, the base material is then obtained having a surface patterned after the pattern board and having a thickness of 8 mm and specific gravity of 0.86. The base material thus obtained is then coated with the engobe material described in Example I and is then baked in the baking furnace. A coating of the glaze material used in Example I is further applied to the surface of the base material, which is then baked in the baking furnace. The conditions employed for both coating processes are the same as described in Example I. Thus, a final product is formed, having specific gravity of 0.87. As noted, its specific gravity is almost equal to that of the base material. The noncombustible and smokeless composite product may be used with other commercial plywood, particle board, asbestos slate board, asbestos board or similar board to which it is attached by commercially suitable adhesives.

EXAMPLE V

Commercial perlite is baked in the baking furnace at a temperature of approximately 850° C during a period of about 3 hours. In the meantime, about 200 g. of sodium silicate No. 3 is stirred while adding about 50 g. of ASC-3 gradually thereto to form a mixture. The mixture is then added to about 400 g. of the baked perlite and is thoroughly mixed therewith through the stirring process. The mixture is next poured into a 28 × 28cm metal mold which has a pattern board placed at the bottom thereof, so that it can be formed into the desired shape. The mold is placed in a hot press at a temperature of approximately 125° C. The hot press provides an initial pressure of approximately 20 kg/cm$^2$ during a period of about 1 minute. At the end of this period, the pressure is released from the hot press so that air can be vented from inside the material. Then a pressure of approximately 6 kg/cm$^2$ is exerted under which the material is hot-pressed during a period of about 14 minutes. The mold is next removed from the hot press after this period, and is allowed to cool to room temperature. A base material is thus obtained, which has a specific gravity of 0.7 and thickness of 8 mm. Under the conditions described in Example I a coating of the engobe material is further applied to the surface of the base material and the coated base material is again baked in the baking furnace, after which a coating of the glaze material is applied to the surface thereof and is then baked. Thus, a final product is obtained, which is about 8 mm thick and has a specific gravity of 0.71.

EXAMPLE VI

About 210 g. of sodium silicate is thoroughly stirred while about 55 g. of ASC-3 is gradually added and mixed therewith to form a mixture. The mixture is then added to about 260 g. of silas balloon, and the two are thoroughly mixed. After a uniform mixture is obtained, it is then mixed with one or more metal oxides (the choice of metal oxides depending on the color desired as noted in Example I) in an amount equal to approximately 10% of the weight of the silas balloon. The resultant mixture is then poured into a 28 × 28cm metal mold in which it is formed into the desired shape. The mold is set in a hot press at a temperature of approximately 120° C, and is subjected to an initial pressure of approximately 20 kg/cm$^2$ during a period of about 1 minute. After this period, it is further hot-pressed under a pressure of approximately 5 kg/cm$^2$ during a period of about 10 minutes. Thus, a base material is formed having a thickness of 8 mm and specific gravity of 0.78. Further, the base material is coated with transparent glaze material which comprises about 100 parts of white lead, about 50 parts of frit and about 100 parts of water which are thoroughly mixed together, said coating of transparent glaze being applied uniformly to the surface of the base material at the rate of about 0.006 to 0.007 g/cm$^2$. After the application of glaze material, the base material is then dried at a temperature of about 120° C, and is further baked in a baking furnace at a temperature of about 750° C during a period of about 1.5 minutes. After being cooled rapidly to room temperature, it becomes a final product which provides both noncombustible and smokeless characteristics. It is about 8 mm thick, and has a specific gravity of 0.79.

The table given below shows the characteristics of the different products, including the base material, according to the working examples of the invention described above.

| | | | Characteristics of Various Composite Materials Produced According to the Invention | | | | | | | |
|---|---|---|---|---|---|---|---|---|---|---|
| Example | Specific Gravity | Bending Strength (kg/cm$^2$) | Rate of Equilibrium Moisture Absorption (%) | Rate of Equilibrium Water Absorption (%) | Rate of Swelling at Equilibrium Water Absorption (%) | Dipping in Water (pH of Water after 24 hrs) | Test Results | Specific Bending Strength (kg/cm$^2$) | Heat Conductivity (Kcal/mhc) | Bending Modulus (kg/cm$^2$) | Adhesion ness with Other Commercial Materials |
| Base Material | | | | | | | | | | | |

-continued

Characteristics of Various Composite Materials Produced According to the Invention

| Example | Specific Gravity | Bending Strength (kg/cm$^2$) | Rate of Equilibrium Moisture Absorption (%) | Rate of Equilibrium Water Absorption (%) | Rate of Swelling at Equilibrium Water Absorption (%) | Dipping in Water (pH of Water after 24 hrs) | Test Results | Specific Bending Strength (kg/cm$^2$) | Heat Conductivity (Kcal/mhc) | Bending Modulus (kg/cm$^2$) | Adhesion ness with Other Commercial Materials |
|---|---|---|---|---|---|---|---|---|---|---|---|
| Example I Product | 0.75 | 45 | 21.5 | 85.5 | 0.05 | 9.2 | good | 60 | 0.09 | 39,000 | good |
| Example I Product | 0.75 | 65 | 20.6 | 85.1 | 0 | 7.3 | good | 86 | 0.06 | 41,300 | good |
| Example II Product | 0.96 | 70 | 20.1 | 81.3 | 0 | 7.2 | good | 73 | 0.13 | 55,000 | good |
| Example III Product | 0.77 | 66 | 20.5 | 82.8 | 0 | 7.5 | good | 86 | 0.09 | 42,000 | good |
| Example IV Product | 0.86 | 70 | 17.7 | 75.4 | 0 | 7.4 | good | 81 | 0.07 | 46,500 | good |
| Example V Product | 0.70 | 40 | 18.5 | 75.6 | 0 | 7.3 | good | 57 | 0.07 | 34,000 | good |
| Example VI | 0.79 | 65 | 17.5 | 77.7 | 0 | 7.3 | good | 82 | 0.08 | 46,600 | good |

Remarks (1) Where the materials shown are used with other known materials, the above results show the values for vermiculite composite material, silas composite material and perlite composite material only, the known materials including plywood, plaster boards and asbestos boards.

(2) Equilibrium moisture absorption rate is measured by using $K_2SO_4$ saturated desiccator, PH 96.5% and equilibrium water absorption rate measured at 20° C.

In accordance with the present invention described with reference to the several examples thereof, the noncombustible and smokeless composite material comprises a base material containing an agglomerate mass of foamed inorganic material, to the surface of which a coating of glaze material is applied and is baked to form a glossy surface with a multitude of micropores thereon. It has a good moisture-absorbing character, an equilibrium moisture-absorption rate equal to that of natural wood, and a specific bending strength of close to 100 kg/cm$^2$. Other advantages include its low heat-conductivity which insulates it from heat, sound-insulating character, light weight (specific gravity in the range of between 0.3 and 1.0, which is optional), and good adhesiveness with other commercial building materials. By adjusting the thickness of the coating of the glaze material to be formed on the surface of the base material, it is possible to obtain different surface hardness which depends on the different thickness of the glaze coating. In particular, the composite material according to the invention is advantageous over the other prior materials in that it does not change its dimensions even at extremely high temperatures, which may arise in case of a fire hazard, for example, and therefore will not crack. These advantages are not possessed by any of the known incombustible materials such as asbestos board, for example.

Furthermore, the method according to the present invention provides various advantages over the prior methods, since it provides various materials of different colors, patterns, sizes and thickness, and enables mass production to be achieved under controlled manufacturing conditions, whereby products of uniform quality can be obtained.

Although the invention has been described by way of examples, it should be understood that various changes and modifications may be made without departing from the spirit and scope of the invention.

I claim:

1. A composite material comprising a substantially uniform mixture of an inorganic adhesive and a foamed inorganic material firmly bonded together, the weight ratio of the foamed inorganic material to the inorganic adhesive being in the range from 1:1 to 1:0.5, wherein the foamed inorganic material is selected from the group consisting of vermiculite, perlite, silas balloon, alumina pulp, carnamite, amosphur, silica balloon, dia balloon, micro balloon and glass micro balloon, and the inorganic adhesive is a mixture of 2-6 parts by weight of sodium silicate and one part by weight of an additive substance selected from the group consisting of (1) lithium silicate, (2) denatured silica sol, (3) aluminium phosphate and (4) a mixture of 1.6 parts by weight of condensed aluminum phosphate, 104 parts by weight of non-colloidal silica, 4 parts by weight of titanium dioxide, 100 parts by weight of colloidal silica, 0.4 part by weight of gel-forming agent extracted from bentonite and 5 parts by weight of acrylic acid ester.

2. A noncombustible, smokeless composite material which absorbs moisture and is water-insoluble, comprising, (A) as base material, a composite material comprising a substantially uniform mixture of an inorganic adhesive and a foamed inorganic material firmly bonded together, the weight ratio of the foamed inorganic material to the inorganic adhesive being 1:1 to 1:0.5, wherein the foamed inorganic material is selected from the group consisting of vermiculite, perlite, silas balloon, alumina pulp, carnamite, amosphur, silica balloon, dia balloon, micro balloon and glass micro balloon, and the inorganic adhesive is a mixture of 2-6 parts by weight of sodium silicate and one part by weight of an additive substance selected from the group consisting of (1) lithium silicate, (2) denatured silica sol, (3) aluminium phosphate and (4) a mixture of 1.6 parts by weight of condensed aluminium phosphate, 104 parts by weight of non-colloidal silica, 4 parts by weight of titanium dioxide, 100 parts by weight of colloidal silica, 0.4 part by weight of gel-forming agent extracted from bentonite and 5 parts by weight of acrylic acid ester, and (B) a baked coating of glaze material on the surface of said base material, wherein said glaze coating contains about 600-675 micropores/mm$^2$ of surface area.

3. A composite material according to claim 2, wherein the weight ratio of the sodium silicate to the additive substance is 4:1.

4. A composite material according to claim 3, wherein the additive substance is a mixture of 1.6 parts by weight of condensed aluminum phosphate, 104 parts by weight of non-colloidal silica, 4 parts by weight of titanium dioxide, 100 parts by weight of colloidal silica, 0.4 part by weight of gel-forming agent extracted from bentonite and 5 parts by weight of acrylic acid ester.

5. A composite material according to claim 2, wherein the surface of the base material is embossed.

6. A composite material according to claim 2, wherein the glaze material comprises a uniform mixture of white lead, frit, carboxymethyl cellulose and metal oxide.

7. A composite material according to claim 6, wherein the glaze material comprises a uniform mixture of 100 parts by weight of white lead, 50 parts by weight of frit, 1 part by weight of carboxymethyl cellulose and 1-15 parts by weight of metal oxide.

8. A composite material according to claim 2, wherein a baked coating of engobe material is interposed between the surface of the base material and the glaze coating.

9. A composite material according to claim 8, wherein the engobe material comprises a uniform mixture of kaolin, frit and cobalt oxide.

10. A composite material according to claim 9, wherein the engobe material comprises a uniform mixture of 100 parts by weight of kaolin, 50 parts by weight of frit and 0.75 part by weight of cobalt oxide.

11. A composite material according to claim 2, wherein the base material further comprises a positive amount of up to 3% by weight of inorganic fibers, carbon fibers or metal fibers, based on the weight of the foamed inorganic material.

12. A composite material according to claim 2, wherein the sodium silicate has a specific gravity of 740 Be, an $SiO_2$ content of 28-30% by weight and an $Na_2O$ content of 9-11% by weight.

* * * * *